United States Patent
Zachos et al.

(10) Patent No.: US 7,645,328 B2
(45) Date of Patent: Jan. 12, 2010

(54) ADSORPTION DRYER FOR GASEOUS MEDIA WITH AT LEAST ONE TUBULAR PRESSURE VESSEL

(75) Inventors: Alexandros Zachos, Essen (DE); Günter Priess, Krefeld (DE)

(73) Assignee: Zander Aufbereitungstechnik GmbH & Co. KG, Essen (DE)

( * ) Notice: Subject to any disclaimer, the term of this patent is extended or adjusted under 35 U.S.C. 154(b) by 238 days.

(21) Appl. No.: 11/814,444

(22) PCT Filed: Nov. 4, 2005

(86) PCT No.: PCT/EP2005/011812

§ 371 (c)(1),
(2), (4) Date: Nov. 16, 2007

(87) PCT Pub. No.: WO2006/079371

PCT Pub. Date: Aug. 3, 2006

(65) Prior Publication Data

US 2008/0134897 A1 Jun. 12, 2008

(30) Foreign Application Priority Data

Jan. 24, 2005 (DE) .................. 10 2005 003 377

(51) Int. Cl.
*B01D 53/26* (2006.01)
(52) U.S. Cl. .............................. 96/121; 96/149; 55/513
(58) Field of Classification Search .................. 96/121, 96/137, 138, 149, 151; 34/80; 422/177–179, 422/190, 191, 211, 212; 55/513, 516, 518, 55/519, DIG. 17
See application file for complete search history.

(56) References Cited

U.S. PATENT DOCUMENTS 4,026,685 A * 5/1977 Grix ........................... 96/113
4,261,715 A * 4/1981 Frantz ........................ 96/137

(Continued)

FOREIGN PATENT DOCUMENTS

| DE | 37 90 492 C2 | 6/1997 |
| DE | 600 03 713 T2 | 4/2004 |
| DE | 10 2004 021 427 A1 | 1/2005 |

OTHER PUBLICATIONS

Deutsches Institut fur Normung e. V., Berlin, DIN 472, Preisgr. 9 (1981).
International Search Report for PCT/EP2005/011812, dated Mar. 24, 2006.

*Primary Examiner*—Frank M Lawrence
(74) *Attorney, Agent, or Firm*—Proskauer Rose LLP

(57) ABSTRACT

An adsorption dryer includes a pressure vessel containing the drying agent in a cylindrical chamber, which is in the form of a cylindrical tubing section. The pressure vessel is axially clamped between a bottom and a top distributor plate. In the cylindrical chamber of the pressure vessel, the drying agent is enclosed between a bottom piston and a top piston. The two pistons are radically sealed against the inside of the wall of the pressure vessel. Tongue and groove connections between the wall of the pressure vessel and the piston can hold the pistons axially. The bottom and top distributor plates are clamped with the pistons by means of threaded bolts. The tongue and groove connection between the piston and the pressure vessel and the bolt connection of the distributor plates with the pistons ensure comparatively low cost of production and assembly.

5 Claims, 2 Drawing Sheets

U.S. PATENT DOCUMENTS

| | | | |
|---|---|---|---|
| 4,364,756 A * | 12/1982 | Clarke et al. | 96/137 |
| 4,758,255 A * | 7/1988 | Yamada et al. | 96/137 |
| 4,764,189 A | 8/1988 | Yanagawa et al. | |
| 4,805,943 A | 2/1989 | Balsells | 285/318 |
| 4,828,589 A | 5/1989 | Bauer et al. | |
| 4,971,688 A * | 11/1990 | Francois et al. | 210/94 |
| 5,595,588 A | 1/1997 | Blevins et al. | |
| 5,827,358 A * | 10/1998 | Kulish et al. | 96/115 |
| 6,293,125 B1 * | 9/2001 | Cole et al. | 62/475 |
| 6,723,154 B2 | 4/2004 | Olsson et al. | 95/118 |
| 6,793,719 B2 * | 9/2004 | Kim et al. | 96/130 |
| 6,811,349 B1 | 11/2004 | Loe et al. | 403/327 |
| 7,476,269 B2 * | 1/2009 | Begley et al. | 96/147 |

* cited by examiner

ADSORPTION DRYER FOR GASEOUS MEDIA WITH AT LEAST ONE TUBULAR PRESSURE VESSEL

CROSS-REFERENCE TO RELATED APPLICATIONS

This application is a National Phase Application of International Application No. PCT/EP2005/011812, filed Nov. 4, 2005, which claims benefit of priority to German Application No. DE 10 2005 003 377.6-43, filed Jan. 24, 2005, which is owned by the assignee of the instant application. The disclosure of each of the above applications is incorporated herein by reference in its entirety.

FIELD OF THE INVENTION

The invention relates to an adsorption dryer for gaseous media with at least one pressure vessel filled with drying agent, which is arranged between a bottom and a top distribution plate, comprising connection channels and ports for supply and removal of the media and has a cylindrical chamber for the drying agent, which in the chamber on the bottom and top in each case is supported by a piston sealed against the wall of the chamber, wherein the support on at least one side is provided by means of a gas-permeable plate held on the adjacent piston with a compression spring and wherein the chamber is connected by means of lines sealed off from the piston to the connection channels in the distributor plates.

BACKGROUND

Adsorption dryers of this kind are well-known. As far as they comprise two or more pressure vessels, these usually operate alternately between "drying and regeneration". With such adsorption dryers known from practice the pressure vessel consists of a cylindrical tube with pistons installed therein, sealed on both sides of the drying agent. The pistons on the side turned away from the drying agent are formed integrally with screw-type plugs, which can be screwed into the tube. The production and the assembly of such pistons comprising screwed plugs are complex. Furthermore, the screw connection is sensitive and therefore prone to problems.

SUMMARY OF THE INVENTION

The invention features, in one embodiment, an adsorption dryer of the kind initially specified, which can be produced at little cost and in regard to which assembly and maintenance are easy to carry out.

The pistons on their annular outer edge turned away from the drying agent have a step and the wall of the chamber on the inside has an annular groove opposite the step, and that as a kind of tongue and groove connection a spring element seated in the annular groove and on the step limits the movement of the respective piston towards the adjacent distributor plate.

In the case of the adsorption dryer according to the invention both production and assembly/maintenance require comparatively little cost since no screwed plugs are necessary to hold the pistons. The pistons fixed by the tongue and groove connection can also be used according to one arrangement of the invention for axial clamping of the pressure vessels with the top and bottom distributor plate by the distributor plates being screwed onto each of the adjacent pistons by means of threaded bolts.

While the empty space between the top piston and the gas permeable plate serves as a collecting area for the medium to be supplied and removed via the line in the piston, a comparable collecting area, even though substantially smaller in volume, should also be provided between the bottom piston and the drying agent. This can be realized according to one arrangement of the invention due to fact that the drying agent is supported by a gas-permeable plate at a distance from the bottom piston.

The lines required for supply and removal of the media to and from the drying agent can be realized according to a further arrangement of the invention both from a production and assembly aspect due to the fact that they are formed as vertical tubes formed between the chamber and the distributor plates with plug connections provided at their two ends.

If the adsorption dryer comprises several similar pressure vessels, it is advantageous to arrange these in parallel next to each other and to mount these on common distributor plates.

BRIEF DESCRIPTION OF THE DRAWINGS

The invention is described in detail below on the basis of a drawing illustrating an exemplary embodiment, wherein.

DESCRIPTION

Figure 1:
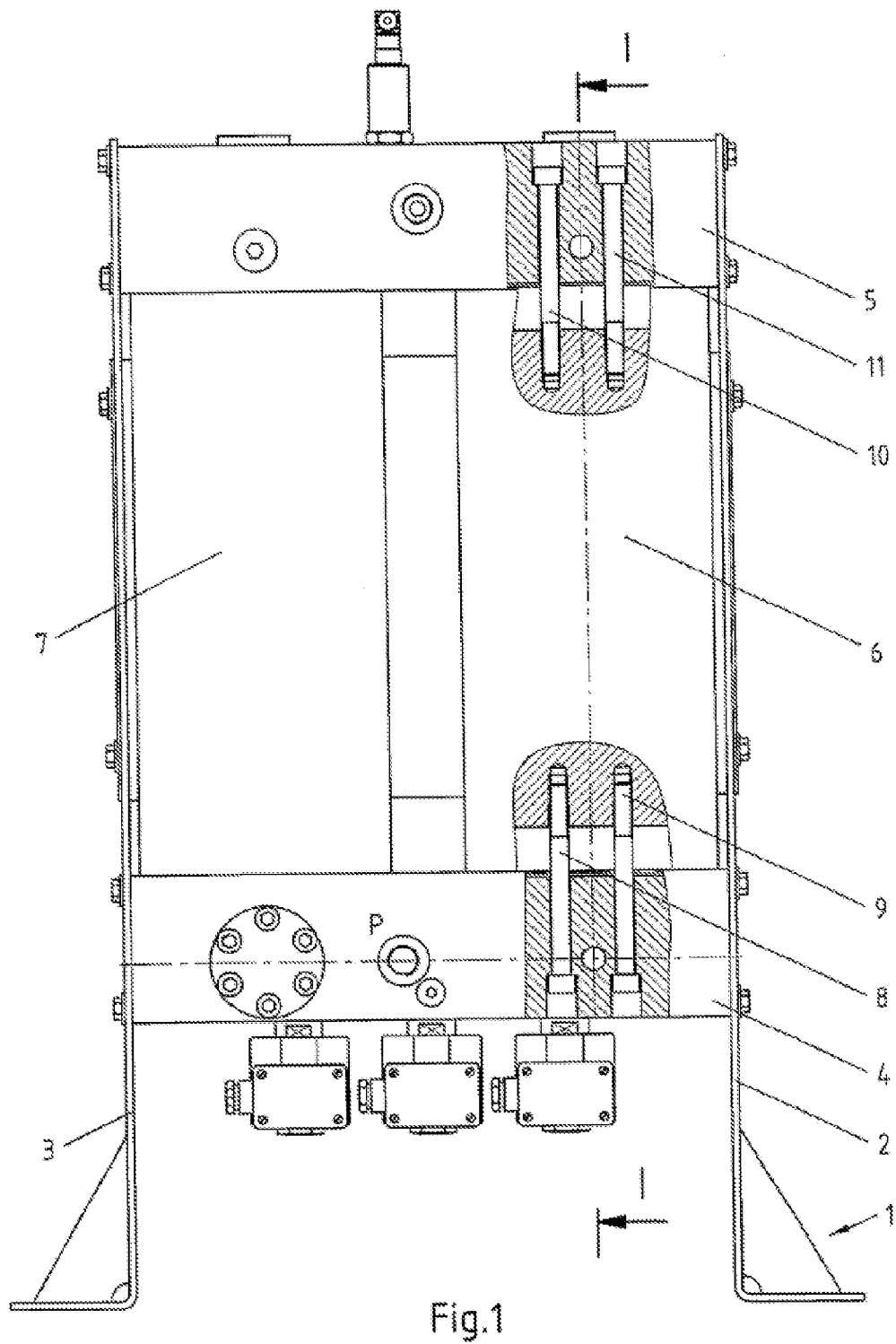
FIG. 1 shows an adsorption dryer for gaseous media with two pressure vessels seen from the side.

The adsorption dryer comprises a support frame 1 with side stands 2, 3, between which a bottom distributor plate 4 and a top distributor plate 5 are fastened. Two pressure vessels 6, 7 produced from cylindrical tubes are arranged between the distributor plates 4, 5. Each pressure vessel 6, 7 is held by threaded bolts 8, 9, 10, 11 of the distributor plates 4, 5 in a way described in detail later. Connection channels 4a, 5a and ports for the medium to be supplied and removed are provided in the distributor plates 4, 5.

Figure 2:
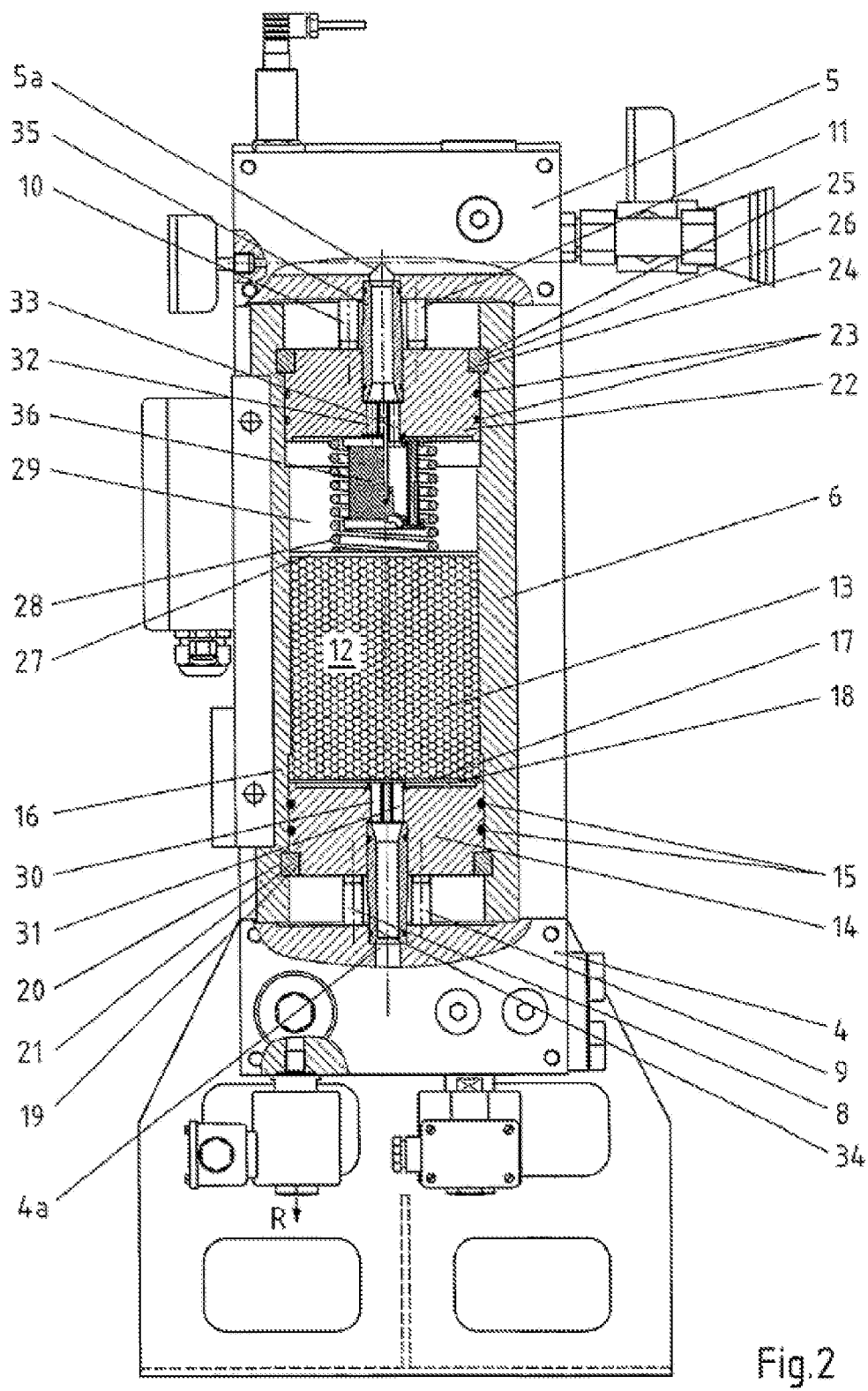
FIG. 2 shows the adsorption dryer in accordance with FIG. 1 in vertical cross section along line 1-1 of FIG. 1.

The structure of each pressure vessel 6, 7 is the same. Therefore, the further description can be limited to the pressure vessel 6. As FIG. 2 shows, the tubular pressure vessel 6 comprises a cylindrical chamber 12, in which drying agent 13 is contained. The cylindrical chamber 12 is closed at the bottom by a piston 14, which is sealed against the cylindrical wall 16 of the chamber 12 with ring gaskets 15. The drying agent 13 does not rest directly on the piston 14, but on a thin gas-permeable plate 17 supported at a distance from the piston 14. Thus, a small collecting area 18 is created between the piston 14 and the plate 17. The movement of the piston 14 is limited downwards by a tongue and groove connection. This consists of an annular step 19 on the outer edge of the piston 14, an annular groove 20 in the inside of the cylinder wall 16 and a spring element 21, which for reasons of easier assembly can consist of an integral slit annular spring or of several segments.

On the topside the pressure vessel 6 likewise comprises a piston 22, which is sealed against the cylinder wall 16 with ring gaskets 23. The top piston 22 just like the bottom piston 14 is axially held in place by means of a tongue and groove connection 24, 25, 26. Also, in this case the drying agent 13 is not directly supported on the piston 22, but on a thin gas permeable plate 27, which for its part is held by means of a coil spring 28 on the piston 22. Thus, the drying agent 12 is kept under pressure. In addition, the tongue and groove connection 24, 25, 26 is held in position by the coil spring 28. On the other hand, the spring 23 enables the piston 22 to be pushed back and thus the tongue and groove connection 24, 25. 26 can be released.

As already stated, threaded bolts 8, 9, 10, 11 of the bottom and top distributor plate 4, 5 are used for axial clamping of the pressure vessel 6. As can be seen from the drawings the threaded bolts 8, 9, 10, 11 are screwed into the pistons 14, 22. The supply and removal of the dried or to be dried medium take place via the bottom and top distributor plate 4, 5. For connection of the collecting areas 18, 29 below and above the chamber 12 for the drying agent 13, roughly central channels 30, 31, 32, 33 are axially formed in the pistons 14, 22. These channels 30, 31, 32, 33 open into vertical tubes 34, 35, which sealed off at their two ends on the one hand enter the pistons 14, 22 and on the other hand enter the distributor plates 4, 5 with the connection channels 4a, 5a formed therein for supply and removal of the media. Such vertical tubes 34, 35 permit fast assembly. As is evident from FIG. 2, a bell shaped filter element 36 can again be provided before the channels 32, 33 in the collecting area 29. This filter element is designed to trap drying agent dust, which during the drying operation could otherwise with the dried medium get into the sensitive components of the top distributor plate.

What is claimed is:

1. An adsorption dryer for gaseous media having at least one pressure vessel arranged between a bottom distributor plate and a top distributor plate comprising connection channels and ports for the gaseous media, the at least one pressure vessel having a cylindrical chamber for a drying agent, the cylindrical chamber supported on its bottom and top by a bottom-end piston and a top-end piston, respectively, each piston sealed against a wall of the cylindrical chamber, support for at least one of the bottom and the top of the cylindrical chamber provided by a gas-permeable plate held on the respective piston with a compression spring, and wherein the cylindrical chamber is connected by lines sealed off from the connection channels in the distributor plates, wherein at least one of the bottom-end piston and the top-end piston on an annular outer edge turned away from the drying agent has a step and the wall of the chamber on the inside has an annular groove opposite the step to form a tongue and groove connection, a spring element seated in the annular groove and on the step limits the movement of the respective piston towards the adjacent distributor plate.

2. The adsorption dryer according to claim 1, wherein the drying agent is supported by a gas-permeable plate at a distance from the bottom piston.

3. The adsorption dryer according to claim 1 wherein the lines are arranged between the chamber and the distributor plates as vertical tubes with plug connections provided at both ends.

4. The adsorption dryer according to claim 1 wherein at least one of the bottom distributor plate and the top distributor plate is secured to the adjacent piston by threaded bolts.

5. The adsorption dryer according to claim 1 further comprising a plurality of pressure vessels operating alternately between drying and regeneration, the plurality of pressure vessels arranged in parallel next to each other and mounted on common distributor plates.

* * * * *

UNITED STATES PATENT AND TRADEMARK OFFICE
CERTIFICATE OF CORRECTION

| | | |
|---|---|---|
| PATENT NO. | : 7,645,328 B2 | Page 1 of 1 |
| APPLICATION NO. | : 11/814444 | |
| DATED | : January 12, 2010 | |
| INVENTOR(S) | : Alexandros Zachos and Günter Priess | |

It is certified that error appears in the above-identified patent and that said Letters Patent is hereby corrected as shown below:

On the cover page, item [73] under Assignee, delete "Zander Aufbereitungstechnik GmbH & Co. KG" and replace it with --Zander Aufbereitungstechnik GmbH--

Signed and Sealed this
Sixteenth Day of August, 2011

David J. Kappos
*Director of the United States Patent and Trademark Office*